United States Patent [19]

Van Iperen

[11] 4,371,298

[45] Feb. 1, 1983

[54] VEHICLE SUPPORTING RAMPS FOR CARGO CONTAINERS

[75] Inventor: Willem H. P. Van Iperen, Westfield, N.J.

[73] Assignee: Sea-Land Industries, Inc., Elizabeth, N.J.

[21] Appl. No.: 251,314

[22] Filed: Apr. 6, 1981

[51] Int. Cl.³ .................. B60P 3/007; B60P 7/008; B32B 1/000

[52] U.S. Cl. .................................. 410/25; 52/90; 52/639; 254/88; 410/13; 410/20; 410/23; 410/30; 428/178

[58] Field of Search .............. 410/25, 24, 26–30, 410/3, 6–13, 16, 19–23; 52/90, 639; 254/88; 428/178

[56] References Cited

U.S. PATENT DOCUMENTS

| | | | |
|---|---|---|---|
| 1,860,565 | 5/1932 | Berger et al. | 410/9 |
| 3,870,277 | 3/1975 | West | 254/88 |
| 4,310,271 | 1/1982 | Canellis et al. | 410/24 X |

Primary Examiner—Joseph F. Peters, Jr.
Assistant Examiner—M. J. Hill

[57] ABSTRACT

A knockdown disposable vehicle ramp for shipment of vehicles securely fastened to the floor of container to elevate and support one end of a wheeled vehicle in nesting alignment with another wheeled vehicle whereby a series of in-line vehicles may be positioned within a single container for shipment with each of the disposable ramps being secured in position during vehicle loading. Each of the disposable ramps is constructed of corrugated fiberboard and positioned to support the loads to which the ramp may be subjected with each ramp being provided with an inclined plane on which the wheel of a vehicle may be elevated for positioning to a wheel well on the ramp for cooperatively supporting a wheel mounted on the vehicle. Ramp and wheel well reinforcing means are positioned to support loads to which the ramp is subjected. A wheel-mounted harness securely retains the vehicle-mounted wheel on the ramp wheel well limiting vehicle displacement.

4 Claims, 8 Drawing Figures

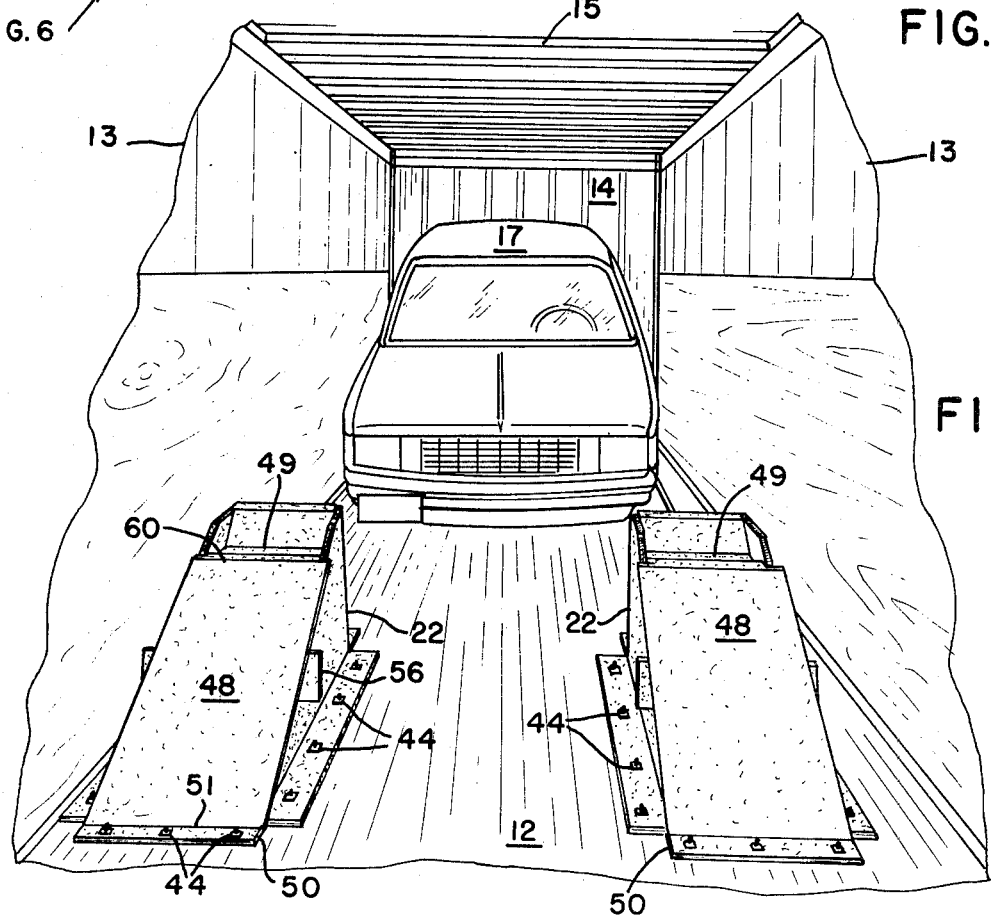

4,371,298

VEHICLE SUPPORTING RAMPS FOR CARGO CONTAINERS

BACKGROUND OF THE INVENTION

The handling, loading, shipment and unloading of motor vehicles from one geographical location to another and particularly for overseas shipment have been costly and time consuming operations. Many vehicles are shipped on vessels between decks by being fastened securely by chains, cables or other suitable tie-down devices. Other vehicles have been shipped in containerized units and have necessitated suitable chocking and tie-down devices with limitations being placed upon the number of vehicles that are capable of being shipped in a single container.

Various attempts have been made to maximize the number of vehicles that may be suitably stored and shipped in containerized units in view of the length limitations for the containers which are in the range of 35 to 40 feet long. Various attempts have been made to increase the number of vehicles that may be shipped in a single container or containerized unit but the cost of installing some of the structures and the cost of the structures themselves have been uneconomical. The recognition of being able to increase the load-carrying capacity of a single containerized unit to one additional vehicle will result in considerable savings by reducing the cost of shipping from one location to another aboard containerships.

OBJECTIVES AND ADVANTAGES OF THE PRESENT INVENTION

It has been determined that the space limitations in a standard container unit has severely limited the alternatives that may be employed to increase the load-carrying capacity of an individual container. However, it has been determined that by elevating the rear end of a vehicle and supporting it in an elevated position, the front end of the vehicle may be lowered sufficiently so that the rear end of a second vehicle may be elevated and supported directly over the lowered front end of the first vehicle. By following this procedure, a series of vehicles may be compactly nested in-line within a single container by utilizing relatively inexpensive knockdown disposable vehicle ramps that are capable of being installed inexpensively and rapidly during vehicle onloading, and the vehicle ramps may be rapidly removed during unloading thereby substantially reducing the cost of shipment of each vehicle simply by accommodating more vehicles within the same container unit.

Therefore, it is an objective of this invention to provide a knockdown disposable vehicle ramp for securely maintaining a vehicle in an elevated position and retaining it securely during transit facilitating nesting of a series of vehicles within a single container unit.

A further objective of this invention is the provision of a relatively inexpensive, knockdown, disposable vehicle ramp suitable for elevating a vehicle on which the wheels are mounted to permit nesting of a series of vehicles and increase the number of vehicles that may be transported within the same container and to facilitate the onloading and offloading rapidly by the use of disposable ramps and harness members.

Yet another objective of this invention is to provide a knockdown and disposable vehicle ramp for storage and shipment of motor vehicles by elevating the rear end of a vehicle to permit nesting of a series of vehicles in alignment to increase the number of vehicles that may be stored within a single container with each of the disposable ramps being constructed essentially of corrugated fiberboard in which the corrugations are positioned in a manner to support the load of the vehicle while restricting vehicle movement on the ramp during transit of a container unit from one location to another.

Yet another objective of this invention is the provision of a relatively inexpensive and disposable vehicle ramp and harness device that may be rapidly installed during vehicle loading for retaining the maximum number of vehicles in a container unit and for rapidly and inexpensively removing the vehicles from the container after reaching its destination and thereby reduce substantially the cost of shipment of the load of vehicles in the containerized unit.

SUMMARY OF THE INVENTION

The knockdown disposable vehicle supporting ramps are securely fastened to the floor of a containerized unit for elevating the rear end of a motor vehicle thereby to lower the front end to enable the next vehicle in line to be elevated on the next series of disposable supporting ramps to support the next vehicle directly above the lowered front end of the first vehicle thereby permitting more vehicles to be stored in the same container. The disposable ramp is provided with an inclined plane supported by side walls and an end wall preferably constructed of corrugated fiberboard having load-supporting vertically-extending corrugation on which a longitudinally-extending wheel guide ramp and wheel well may be mounted on the inclined side walls. The wheel guide ramp and wheel well are supported within the ramp assembly to support the load of the vehicle. Preferably, corrugated fiberboard having vertically-extending corrugations are supported within the ramp assembly in the space between the side walls and within the wheel positioning section permitting the load to be distributed to the vertically-extending corrugations of the various plies of corrugated fiberboard.

The individual vehicle supporting ramps are preassembled and mounted in pairs by securing to the floor of the container for elevating the rear of the first vehicle rolled into the container. Suitable wheel-engaging harnesses are mounted on the wheels and securely fastened to the container floor to maintain the vehicle in position while permitting the vehicle spring and shock system to function normally.

The next set of supporting ramps are secured in spaced relation to the first set of ramps to receive the next vehicle for support after being rolled up on the ramp assembly and positioned in place in the wheel wells of the ramp assembly after which the second vehicle has the wheel harnesses secured before passing to the next set of ramps for installation in the same manner described previously.

After the container has been shipped to its final destination, with the vehicles all being secured in position, the wheel harnesses and any chocks may be removed from the first vehicle adjacent to the exit doors and removed from the container. The disposable ramps for the first vehicle to be offloaded from the container may then be raised and disposed of. The second vehicle may then be removed by releasing the wheel harnesses and the vehicle rolled off and out of the container after which the disposable ramps may be raised from the floor mounting in the container and discharged from the container after which the next vehicle may be offloaded in the same manner, and so on until the container is empty and may be used for other cargo shipments.

It will be readily appreciated that the ramps may be shipped in quantities in the knockdown condition and assembled on the site rapidly before installation into a container as the vehicles are loaded into the container and the harnesses secured over the wheels.

BRIEF DESCRIPTION OF DRAWINGS

FIG. 2 is a partial front view of the interior of a container illustrating the positioning of one vehicle elevated at the rear of the container with the rear end of the vehicle elevated and the front of the vehicle lowered with a pair of assembled knockdown disposable ramps in position for receiving the next vehicle for nesting alignment over the lowered front end of the first vehicle;

FIG. 3 is a longitudinal sectional view of the knockdown ramp shown in FIG. 2;

FIG. 4 is a slightly reduced developed plan view of the wheel guide ramp and wheel well;

FIG. 5 is a side view of FIG. 4;

FIG. 6 is an enlarged partial view of the score indentation in the corrugated fiberboard within the circle 6 of FIG. 5;

DETAILED DESCRIPTION OF PREFERRED EMBODIMENT OF THE INVENTION

Figure 1:
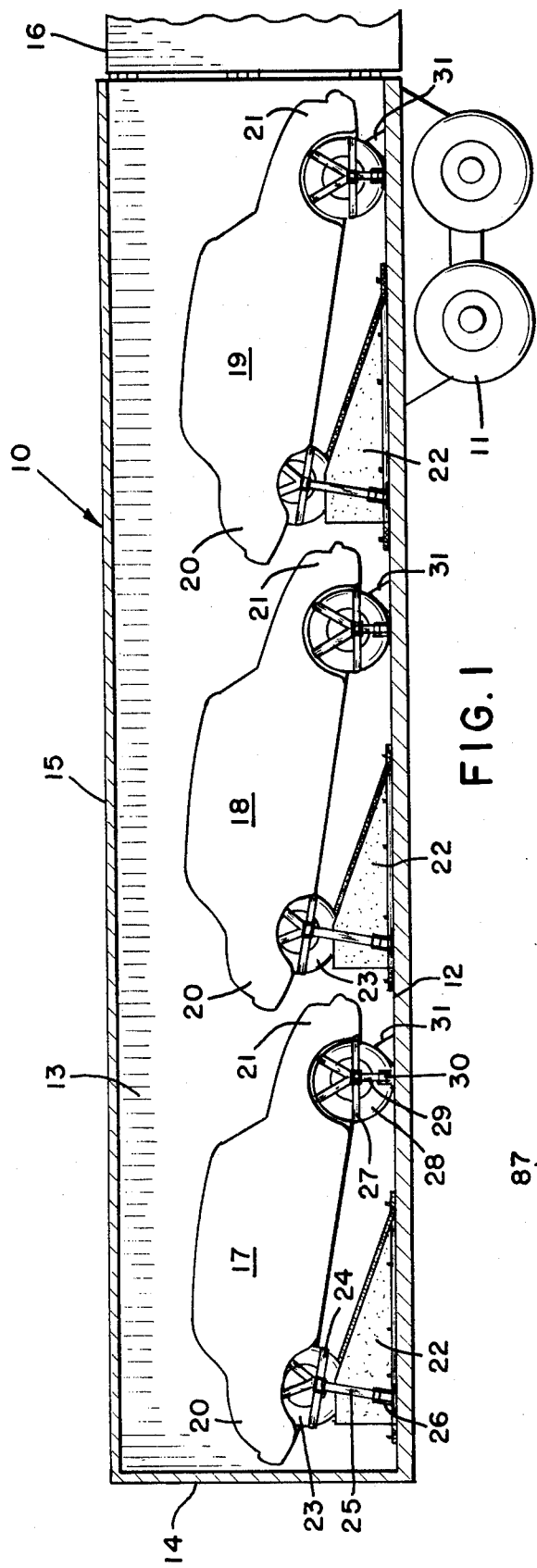
FIG. 1 is a side elevational view of a container in which the container side wall is removed illustrating the nesting of three compact cars utilizing the knockdown disposable ramps and wheel harnesses supporting the vehicles on the container floor.

Referring to the drawings and particularly to FIGS. 1 and 2, there is illustrated a conventional containerized cargo unit 10 for shipping freight in a trailer over land by utilizing a tractor for hauling the container 10 in which case the wheeled undercarriage 11 is utilized but when the container 10 is stowed aboard a vessel the container 10 will omit the wheeled undercarriage for stacking in a conventional manner aboard a container ship whether below or above deck.

The container 10 is provided with a wood base or floor 12 and opposed side walls 13 with a front wall 14, a roof 15, and hinged doors 16 for opening and closing to permit loading, storage and unloading of the cargo from within the container 10. There is illustrated in FIG. 1, a series of three compact vehicles, 17, 18 and 19 which vehicles are nested in line within the container 10 by elevating the rear end 20 of each vehicle thereby to lower the front end 21 of each vehicle so that there is some overlapping of the vehicles to permit an additional vehicle to be loaded within the confines of a 40 foot container in which normally only two vehicles of a compact size could be loaded and shipped. The first vehicle 17 to be loaded into the container is mounted on a knockdown disposable ramp 22 which will be positioned under each of the rear wheels 23 of the vehicle 17 to elevate the rear of the vehicle approximately sixteen (16) to eighteen (18) inches above the floor 12 of the container. By elevating the rear 20 of the vehicle 17, the front end 21 will be lowered sufficiently to permit the rear end 20 of the next vehicle 18 to overlap the lowered portion sufficiently to conserve space when the rear wheels 23 of vehicle 18 are elevated on the disposable ramps 22. When the vehicle 17 is positioned properly on the ramp 22, a wheel harness 24 is tightened about the tire or wheel 23 and the extending strap 25 is securely fastened to a belt fastening reel member 26 that is securely mounted to the container floor 12 to prevent movement of the wheel and vehicle on the ramp 22. A similar wheel harness 27 is mounted on the front wheel or tire 28 and the extending belt end 29 is secured to a belt fastening or locking member 30 to the floor 12. A removable chock or block 31 is positioned in front of the wheel 28 and secured in position as further assurance against vehicle displacement during transit. Since similar ramps, harnesses and chocks which have the same reference characters are utilized throughout, the details of only one of each of such structures will be described in detail, unless otherwise required.

The disposable knockdown ramps 22 are preferably constructed of triple-wall, heavy-duty corrugated fiberboard as the structural load-supporting members and are shipped to the site in the knockdown flat condition for rapid assembly at the site while the vehicles are prepared for loading. The corrugated fiberboard is relatively lightweight, durable and very tough for supporting compressive loads.

The ramp assembly 22 has a U-shaped cross-sectional base member 32 with substantially parallel side walls 33 and 34 with each of the side walls 33 and 34 being provided with upwardly inclined edges 35 that extend from the bottom end 36 at the container floor 12 upwardly to the horizontal perimeter 37 that forms a portion of the wheel well 38 for cooperatively receiving and retaining a vehicle wheel in position at the top of the ramp assembly. The corrugations 39 in the corrugated fiberboard extend vertically to support the compressive load to which the ramp assembly will be subjected. The side walls 33 and 34 are jointed to the rear wall 40 with the corners 41 being suitably notched 42. The side and rear walls 33, 34 and 40 are provided with outwardly extending flanges by appropriately notching the side and rear walls to permit the flanges 43 to be positioned flatly against the container floor 12 and secured in position at the appropriate location by means of fastening nails 44 which are provided with a flat washer 45 for increased surface contact and with the nail 45 being provided with a lower head 46 and an upper head 47 with the upper head being provided for each of nail removable by means of a claw hammer or crowbar when the ramps are to be removed rapidly during vehicle unloading.

A pair of adjacent ramps 22 is shown in FIG. 2 securely mounted in position by means of the securing nails 44 that pierce through the flanges 43 and penetrate into the wood floor 12 of the container to prevent displacement of the ramp assembly 22.

Each of the ramps 22 is provided with a longitudinally-extending wheel guide ramp that is connected to, and forms a part of, an extending wheel well 49 positioned to be supported on the inclined edges 35 of the side walls 33 and 34 with the lower end 50 of the longitudinally-extending wheel guide ramp 48 being suitably scored along the line 51 and fastened by means of the nails 44 to the container floor 12.

A reinforcing ramp member 52, preferably of corrugated fiberboard with vertical corrugations is positioned between the side walls 33 and 34 and is provided with a top inclined edge 53 similar to the inclination of the top edges 35 of the side walls 33 and 34, and is supported in position by nailing the extending flange 54 forming a part of the base of the reinforcing ramp member 52. The reinforcing ramp member 52 is also constructed preferably of corrugated fiberboard with the corrugations extending vertically as in the side walls 33 and 35.

A series of vertical notches 55 is provided in the side walls 33 and 35 and the reinforcing member 52 in alignment for cooperatively receiving the transverse supporting and interlocking member 56 of corrugated fiberboard having spaced notches 57 which cooperate and interlock with the corresponding notches 55 with the top edge 58 of the transverse supporting interlocking member 56 being in line with the top edges 35 and 53 of the side walls 33 and 34, and the reinforcing member 53 over which the longitudinally-extending wheel guide ramp may be positioned and may extend laterally for a short distance outwardly from the side walls 33 and 35 through the projecting side flanges 59 which will be supported additionally by the projecting transverse supporting interlocking member 56.

At the upper terminal portion 60 of the inclined ramp section 48 a wheel well section 49 is formed in the longitudinal strip by providing spaced transverse score lines 61 and additional spaced score lines 62, 63, 64 and 65 that are longitudinally spaced from each other and extend transversely across the reduced width of the wheel well section 49. The terminal tab portion 66 of the wheel well section 49 is downwardly turned and cooperatively retained against the inside of the rear wall 40 at the upper portion thereof and held in position by the corrugated fiberboard member 67 which extends upwardly so that the intermediate section 68 will be at substantially the same level as the upper edge 39 of the side walls 33 and 35 which upwardly extending side wall portions limit lateral displacement of the retained vehicle wheel in the wheel well 49. The member 67 is preferably of corrugated heavy duty fiberboard with the corrugations extending vertically. The forwardly inclined section 69 of the wheel well and the rearwardly inclined section 70 of the wheel well section will serve to limit longitudinal movement of the vehicle wheel once positioned in the wheel well 49. The score lines 61, 62 and 63 provide the desired flexure for the contouring within the wheel well 49 with the side 71 being foreshortened to be received cooperatively between the upwardly extending side walls 33 and 34.

Various forms of load supporting members may be included under the wheel well for supporting the compressive loading to which the wheel well may be subjected by the compressive force exerted by the vehicle including wood blocks or dunnage. However, it has been found preferable to utilize sections of corrugated fiberboard in which the corrugations extend vertically for maintaining maximum compressive loads. In the embodiment illustrated, a four-sided corrugated fiberboard member 72 is fabricated with the walls 73, 74, 75 and 76 being positioned within and below the wheel well and having abutting edges 77 in wall 76. The corrugations in the member 72 extend vertically for receiving compressive loading. A series of flat vertically extending corrugations in the four flat members 78 extend vertically and are supported in position intermediate the wheel well and directly in contact with the bottom of the medial portion 49 thereof to resist the compressive loading to which the wheel well will be subjected constantly. A W-shaped corrugated fiberboard member 79 is positioned on one side of the series of vertical members 78 and a W-shaped corrugated fiberboard member 80 is positioned rearwardly of the fiberboard members 78 and extend upwardly from the container floor to engage the bottom of the wheel well section 49 for additional compressive load distribution similar to but spaced from member 79. A pair of vertically extending corrugated fiberboard members 81 having their corrugations extending vertically are within the four-sided member 72 and are urged forwardly by the W-shaped member 79 to be positioned to absorb the compressive load exerted at the crest 82 of the inclined ramp 48. The corrugated fiberboard member 67 is also urged rearwardly by the W-shaped member 80 to assist in retaining the tab 66 in position.

FIG. 6 illustrates in magnified form a small cross-section of the corrugated fiberboard which has three separate layers of corrugations 83, 84 and 85 to which the compressive loads may be subjected and be supported by the corrugations between which corrugations suitable Kraft paper layers 86 and 87 are positioned with the outer layers 88 and 89 forming the exterior surfaces. The score line 90 provided in the various locations including the ramp is shown in FIG. 6 also that will facilitate arching or bending at suitable locations without mutilating the fiberboard.

Figure 7:
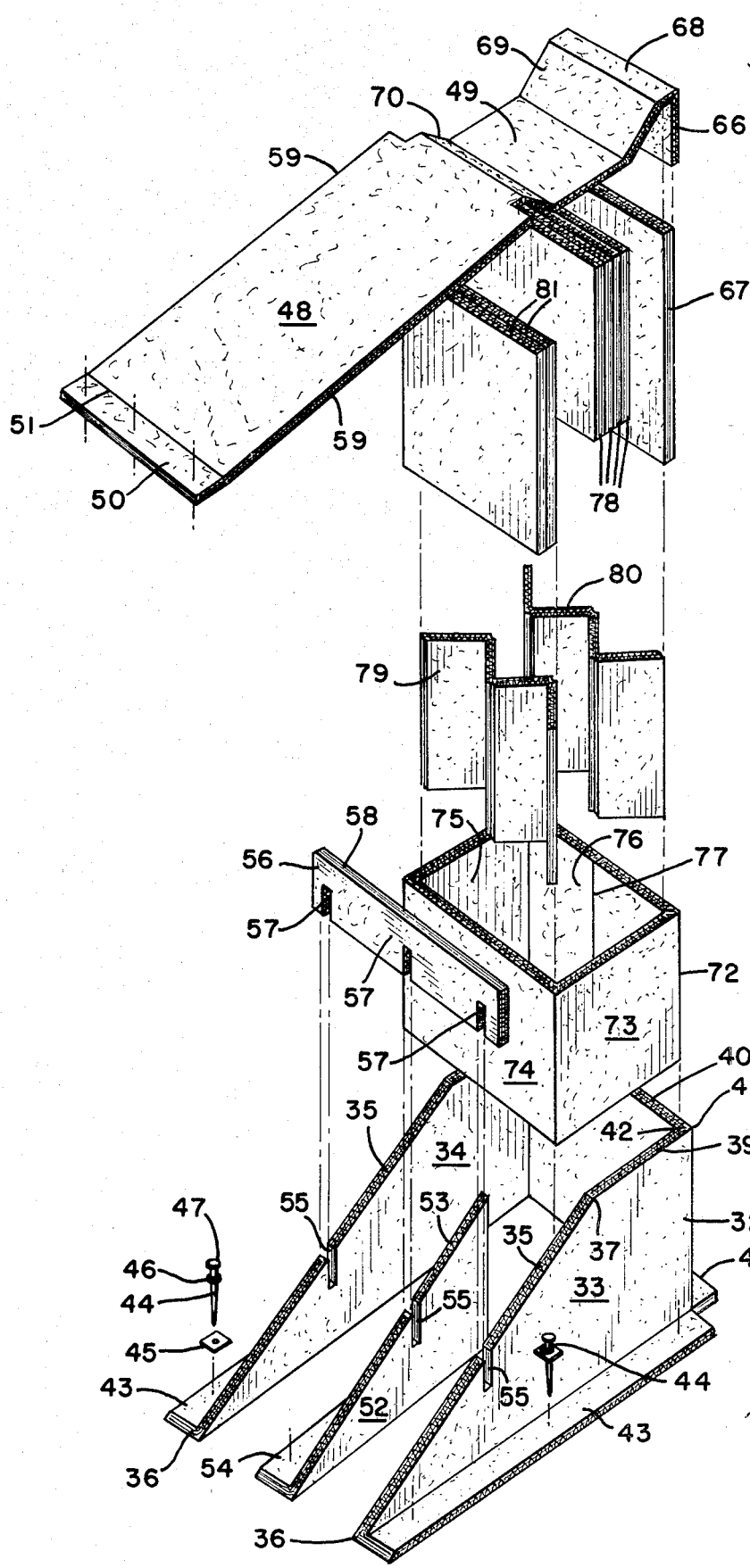
FIG. 7 is an exploded perspective view of the various components forming the knockdown ramp with the various corrugated fiberboard members and fastening means that are interrelated.

Assembly of the knockdown vehicle supporting ramp should be readily apparent from the foregoing description and illustration in FIGS. 3 and 7 which should obviate any further description for assembling the ramp structure. A series of six units may be assembled at the site of loading and the first pair of ramp assemblies will be secured to the container floor 12 after which a car 17 may be driven or rolled into position so that the rear wheels are guided up the inclined ramp 48 to be positioned and rest within the wheel well 49. Front wheel chocks 31 are positioned in front of the front wheels 28 as shown in FIG. 1. If desirable, the second set of ramp assemblies 22 may be fastened to the container floor 12 and the second vehicle 18 rolled into position onto the ramp and the chocks 31 secured in position to prevent rolling of the vehicle forwardly. Thereafter, the third set of ramp assemblies may be secured to the container floor and the third car 19 rolled into position on the ramp and secured by the chocks 31. However, depending upon the accessibility, it may be desirable to mount the wheel harnesses 24 and 27 about each of the wheels and secure them in position on the first vehicle 17 before advancing to the next vehicle and installing the ramp assemblies.

Figure 8:
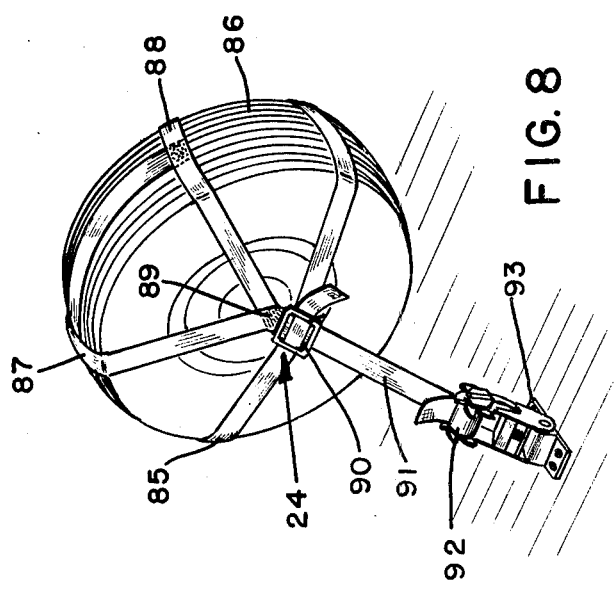
FIG. 8 is a perspective view of a vehicle wheel and harness for securing the vehicle wheel to the container floor to prevent vehicle displacement.

The wheel harness 24, as shown in more detail in FIG. 8 includes a series of flexible straps or bands which may be similar for the rear as well as the front wheels with a main band 85 encircling the tire 86 slightly below the center of the wheel and a pair of diverging straps 87 and 88 being fastened at their juncture 89 to engage with the member 85 and for securement therewith by means of a suitable buckle member 90. A freely extending belt section 91 fastened to the belt sections 87 and 88 is fastened to the ratchet drum 92 that is pivotally mounted on the fastening plate 93 which is securely fastened by nails or other fastening members to the container floor. The ratchet drum and support are standard commercial items of a type produced by Eastern- Rotorcraft Co. Doylestown, Pennsylvania. The harnesses for the front and rear wheels may be substantially identical except that the length of the freely extending belt end 91 for the front wheel may be shortened.

It will be readily apparent that in the transportation of the vehicle by the ramp and supporting harness members, the springs and shock absorbers of the vehicle are free to function since the vehicles are not tied down by chains or cables that prevent the normal vibration of the vehicle.

Upon reaching the ultimate destination, the container door 16 is opened, the front wheel chock 31 is removed, and the wheel harnesses may be released or cut to release the wheels. In some instances the ratchet reels may be removed and disposed of along with the wheel harnesses since they also are disposable items.

Upon freeing the wheels of the first vehicle 19, the vehicle may be driven from the container or rolled off. The ramps 22 may then be removed readily by means of claw hammers or crowbars and disposed of outside of the container before performing the same operations to release the succeeding vehicles 18 and 17 in substantially the same manner. The ramp assemblies constructed of corrugated fiberboard are relatively inexpensive as are the other components including the wheel harnesses making it unnecessary to return for reuse the various components since they are expendable and the cost savings realized in the shipment of the additional vehicle within the same container will make it unnecessary to attempt to reuse the various components.

It is contemplated that various modifications may be made to the various members of the ramp assembly and the longitudinally-extending wheel guide ramp and wheel well fabricated of corrugated fiberboard with transverse corrugations may be replaced by a reinforced fiberglass member or other suitable material, however, the corrugated fiberboard has been found to be highly economical in conjunction with the other corrugated fiberboard components for this knockdown disposable vehicle supporting ramp in which modifications and variations for the various load supporting members are contemplated within the scope of the appended claims.

I claim:

1. A knockdown disposable vehicle supporting ramp for mounting on the floor of a container for elevating the rear end of a vehicle having wheels thereon for nesting in-line with another similarly elevated vehicle comprising; a ramp assembly having a U-shaped cross-sectional configuration, said ramp assembly having vertical side and rear walls connected to each other, said side walls each having an inclined ramp section and a wheel positioning section, said ramp section having downwardly inclined edges in said side walls extending from said wheel positioning section to the container floor, said ramp assembly being constructed of corrugated fiberboard having load-supporting vertically-extending corrugations, a longitudinally-extending wheel guide ramp and wheel well mounted on said ramp assembly, said wheel guide ramp being supported on said inclined edges of said ramp section and said wheel well being positioned in said wheel positioning section, reinforcing ramp supporting means mounted between said side walls for supporting a load on said wheel guide ramp, said wheel guide ramp having a lower end and an upper end, means securing said lower end of said wheel guide ramp to the container floor, means for retaining said upper end in said wheel positioning section for receiving and supporting a vehicle wheel on said wheel well, a four-sided liner cooperatively receivable in said wheel positioning section for supporting a load including reinforced cardboard having vertically extending corrugations, a back stop corrugated fiberboard member having vertical corrugations spaced from said rear wall in said wheel positioning section forming an opening for cooperatively receiving therein a portion of said wheel well, and a plurality of spaced reinforced plies of corrugated fiberboard having vertically-extending corrugations for supporting a load within said four-sided liner to which the wheel well is subjected.

2. A knockdown disposable vehicle supporting ramp as claimed in claim 1, said reinforcing ramp means supported between said side walls including at least one corrugated fiberboard having vertically-extending corrugations for supporting a load to which the inclined ramp is subjected, and a transverse supporting means interlocking with said side walls for retaining said reinforcing ramp means between said side walls.

3. A knockdown disposable vehicle supporting ramp as claimed in claim 1, and a strap harness engaging a wheel in said wheel well for securely fastening the wheel of the vehicle to the container floor whereby wheel movement on said wheel well is restricted.

4. A knockdown disposable vehicle supporting ramp as claimed in claim 1, a harness having belt sections for securely embracing a wheel mounted on the vehicle positioned on said wheel well and having a belt section freely extending from said harness, a belt securing and tightening means mounted on said container floor for securely retaining said freely-extending belt section of said harness to maintain the harnessed wheel in engagement with said wheel well of the ramp assembly during transit.

* * * * *